United States Patent [19]

Schultz et al.

[11] Patent Number: 4,898,216

[45] Date of Patent: Feb. 6, 1990

[54] CTIS CONTROL SYSTEM AND METHOD FOR SENSING AND INDICATION OF INADEQUATE RATE OF CHANGE OF TIRE INFLATION PRESSURIZATION

[75] Inventors: Gary R. Schultz; James A. Beverly, both of Kalamazoo, Mich.

[73] Assignee: Eaton Corporation, Cleveland, Ohio

[21] Appl. No.: 198,412

[22] Filed: May 25, 1988

[51] Int. Cl.⁴ .................... B60C 29/00; G01N 7/00
[52] U.S. Cl. .......................................... 141/4; 141/38; 141/49; 141/83; 141/197; 152/417; 340/442; 364/506; 364/550; 364/558; 73/146.2

[58] Field of Search .................. 141/1, 4, 37, 38, 39, 141/47, 49, 50, 83, 94, 95, 98, 192, 197; 152/415–417; 303/DIG. 3; 137/227, 229, 624.18, 625.25, 557, 583, 584, 588, 12, 14; 73/146, 146.2, 146.4, 146.5; 340/442, 626; 364/558, 556, 550, 510, 506, 424.01, 424.05; 128/202.22

[56] References Cited

U.S. PATENT DOCUMENTS

| | | | |
|---|---|---|---|
| 4,228,513 | 10/1980 | Doljack | 364/550 |
| 4,640,331 | 2/1987 | Braun et al. | 152/417 |
| 4,678,017 | 7/1987 | Schultz | 152/416 |
| 4,720,807 | 1/1988 | Ferran et al. | 364/510 |

Primary Examiner—Henry J. Recla
Assistant Examiner—J. Casimer Jacyna
Attorney, Agent, or Firm—H. D. Gordon

[57] ABSTRACT

A control system and method for sensing and reacting conditions indicative of unacceptable slow CTIS response to selected pressure setting changes.

12 Claims, 3 Drawing Sheets

CTIS CONTROL SYSTEM AND METHOD FOR SENSING AND INDICATION OF INADEQUATE RATE OF CHANGE OF TIRE INFLATION PRESSURIZATION

RELATED APPLICATIONS

This application is related to Ser. No. 198,530, filed May 25, 1988 and titled "FAULT DETECTION METHOD FOR CENTRAL TIRE INFLATION SYSTEM".

BACKGROUND OF THE INVENTION

1. Field of the Invention

The present invention relates to a method for indicating slower than acceptable system response in an on-board central tire inflation system of the type having a plurality of selectable operating settings (i.e. levels) of the inflation pressurization.

2. Description of the Prior Art

On-board central tire inflation systems (CTIS), also known as tire traction systems, are well known in the prior art as may be seen by reference to U.S. Pat. Nos. 3,102,573; 3,276,502; 3,276,503; 4,313,483; 4,418,737; 4,421,151; 4,434,833; 4,640,331 and 4,678,017, the disclosures of all of which are hereby incorporated by reference. CTIS allow the operator to remotely manually and/or automatically vary and/or maintain the inflation pressure of one or more of the vehicle tires from the vehicle (usually a truck) air system, usually while the vehicle is in motion as well as when the vehicle is at rest.

It is well known that the traction of vehicles on relatively soft terrain (i.e. on mud, sand or snow) may be greatly improved by decreasing the inflation pressure within the tires. By decreasing the inflation pressure, the tire supporting surface (usually called the "footprint") will increase thereby enlarging the contact area between the tires and the terrain. Additionally, it is often desirable to decrease the tire pressure from the over-the-road or highway inflation pressure to increase riding comfort on rough roads. On the other hand, higher tire pressures decrease rolling resistance and tire carcass temperatures on smooth roads thereby increasing economy and safety. Accordingly, in cross country vehicles it is desirable to change the inflation pressure in the pneumatic tires to fit the terrain and is also desirable that a system be provided for changing the inflation pressure of the tires from an on-board source, while the vehicle is at motion or at rest and that the system be controlled from the vehicles operating cab.

In a particular type of CTIS, as illustrated and described in above-mentioned U.S. Pat. No. 4,640,331, a plurality of wheel ends (each comprising one or more tires) are each fluidly connected by a separate branch conduit to common central conduit which may be connected to a source of pressurized air for inflating the tires, to a source of regulated pressurized air for deflating the tires and/or, to atmosphere for venting the conduits and relieving pressure across the rotating seals. The common conduit and/or a measurement conduit may also be pressurized by means of a quick release valve or the like to the average pressure of the various branch conduits. A single pressure transducer is provided in fluid communication with the measurement conduit and/or the common central conduit, remote from the wheel ends, for sensing a value indicative of the pressure or average pressure in the inflatable tires.

While the on-board CTIS described above is highly advantageous as pressure venting is remote from the wheel ends and a single pressure transducer, located in a relatively well protected location remote from the wheel ends and/or the vehicle under carriage, can be utilized to sense tire inflation of the vehicle tires or groups of tires, the CTIS was not totally satisfactory in that excessive times for inflation or deflation were not recognized, thereby causing prolonged system operation when further change of tire pressure was not occurring.

SUMMARY OF THE INVENTION

In accordance with the present invention, the drawbacks of the prior art are minimized or eliminated by the provision of a CTIS control system having a method for detecting, and for indicating to the vehicle operator, a condition indicative of delayed system response (i.e. slower than acceptable inflation or deflation of the tires).

The above is accomplished by determining a maximum length of time, or number of inflation-deflation measurement cycles a particular selectable change in inflation settings should require in the absence of system fault. If a selected change in pressure settings is proceeding toward the selected pressure setting, but is not accomplished within the reference period, a delayed system response fault is sensed (usually indicative of air line blockages, partially opened wheel-end valves, compressor inadequate operation, or the like) the operator is notified of the fault, and the CTIS is shut down (commanded to assume and remain in steady state condition, i.e. wheel valves closed and pressure sensing/measurement operations discontinued) preferably, the vehicle operator will be allowed to override the shut-down of the CTIS and resume operation.

In the preferred embodiment, lighted buttons are provided for signalling the currently maintained or currently selected pressure setting. Upon sensing a slow system response fault, the pressure setting buttons of the next higher and lower pressure settings from the current measured inflation pressure are illuminated to indicate the presence of the particular fault and to give the operator an approximate indication of current tire inflation.

This and other objects and advantages of the present invention will become apparent from a reading of the following description of the preferred embodiments taken in connection with the attached drawings.

DESCRIPTION OF THE PREFERRED EMBODIMENT

Figure 1:
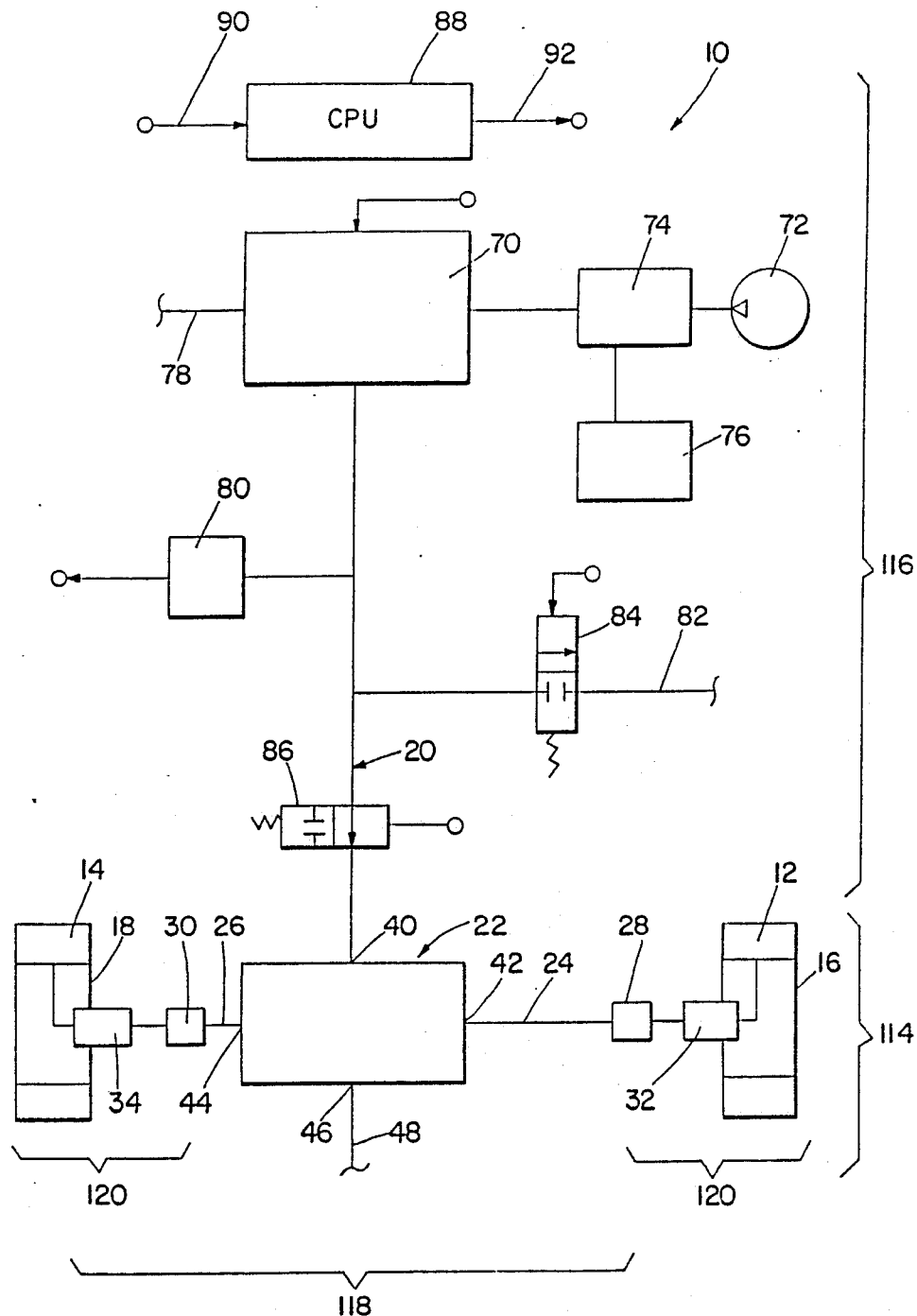
FIG. 1 is a schematic illustration of the pneumatic and electronic components of the present invention as utilized to control the inflation of groups of tires.

In the following description of the present invention, certain terms will be utilized for purposes of reference only and are not intended to be limiting. The terms "upward", "downward", "rightward" and "leftward" refer to direction in the drawings to which reference is made. The terms "inward", and "outward", respectively, refer to directions towards and away from, respectively, the geometric center of the device described. The terms "inflation" and "deflation", respectively, refer to increased and decreased, respectively, pressurization of a tire or the like. Said terminology will include the words above specifically mentioned, derivatives thereof and words of similar import.

The advantages of varying the inflation pressure of the pneumatic tires (especially the driven tires) of a vehicle, especially a relatively heavy duty vehicle, in accordance with the terrain over which the vehicle is traveling are well known in the prior art and may be appreciated by reference to above-mentioned U.S. Pat. No. 4,640,331. Assuming, for example, the vehicle rear drive axle tires are normally inflated about about 75 psi (pounds per square inch) for highway operation, decreasing the tire inflation pressure to be 35 psi for cross country travel over rough road or to about 20-25 psi for operation in sand, mud or snow conditions or to about 10-12 psi for severe emergency conditions, will result in the tire having a greater contact area (i.e. footprint), and improved traction. In addition to improved traction at lower tire inflation pressure, the vehicle will be able to maintain a higher speed over poor ground, and reduce wear and tear on the vehicle, because of the smoother ride over "washboard" type terrain. Conversely, to reduce operating temperature and wear and tear on the tires at highway speed, a higher tire inflation pressure is desired. Of course, to increase mobility, it is highly desirable that the tire inflation pressures be controllable from the vehicle cab from an on-board source of pressurized fluid and be variable and maintainable with the vehicle in motion as well as when the vehicle is at rest.

In an on-board CTIS system wherein the pressurization of certain tires, such as the tires on a particular axle or set of axles, is variable in accordance with operator selection of a desired tire inflation pressurization setting, it is desirable that the CTIS control have a method for detecting undesirably slow system response to achieve a selected pressure setting beyond acceptable limits, to notify the vehicle operator of such condition and to shutoff the CTIS. Preferably, the operator will be provided with means by which the shutoff command can be overriden.

Figure 2:
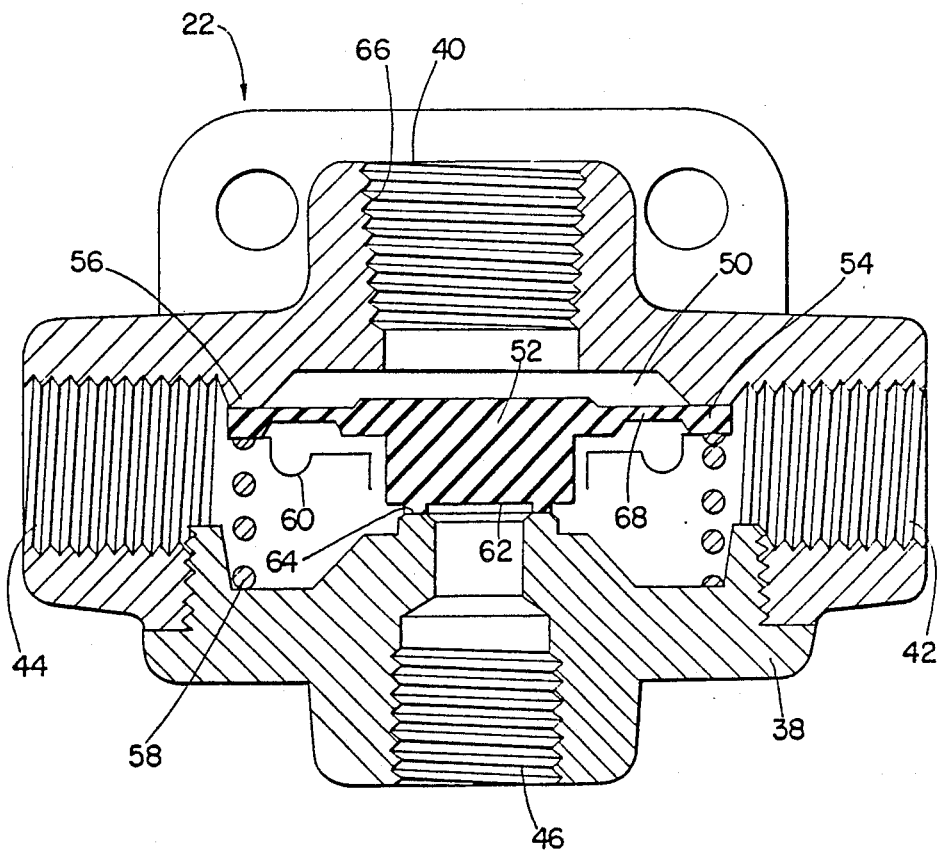
FIG. 2 is a section view of the quick relief valve schematically illustrated in FIG. 1.
Figure 3:
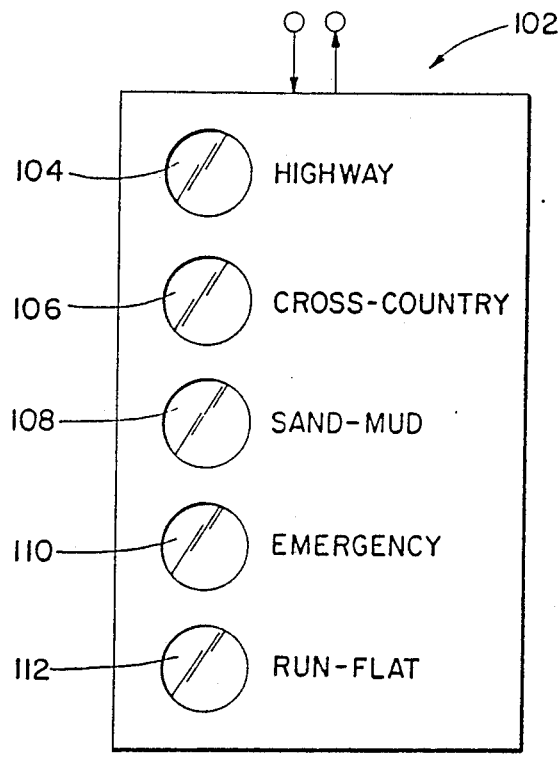
FIG. 3 is a schematic illustration of an operator's control panel.

The CTIS control method of the present invention is especially well suited for the type of CTIS 10 schematically illustrated in FIGS. 1-3 and disclosed in above-mentioned U.S. Pat. No. 4,640,331. CTIS 10 measures and controls the inflation pressure of the interior pressurized chambers 12 and 14 of a group of tires 16 and 18, respectively, by causing the chambers to fluidly communicate with a common conduit, the pressurization of which conduit may be selectively increased, decreased, vented to atmospheric and/or measured. Tires 16 and 18 are typically grouped for this purpose as carried by an axle or set of axles and being of the same ideal inflation pressurization for various operating conditions.

Each of the inflatable chambers 12 and 14 of tires 16 and 18 are fluidly connected to a common quick release valve 22 by means of a branch fluid passage, 24 and 26, respectively. The fluid passages each include a rotary seal assembly 28 and 30, and a wheel-end valve assembly, 32 and 34. The rotary seal assemblies may be of any construction, such as seen in U.S. Pat. No. 4,434,833, the disclosure of which is incorporated by reference.

The wheel end valves 32 and 34 are normally closed to block fluid communication between the tire chambers and the quick release valve 22 and are effective to be selectively opened to fluidly communicate the tire chambers and valve 22. Wheel end valves 32 and 34 are preferably controlled by pressurization/evacuation in the conduits 24 and 26 and are opened or closed as a group. Wheel end valves 32 and 34 may be of the structures illustrated in above-mentioned U.S. Pat. Nos. 4,640,331 and 4,678,017.

The structure and operational function of valve 22 may be seen in greater detail by reference to FIG. 2. Valve 22 includes a valve body 38 defining a first port 40 connected to common conduit 20, a second port 42 connected to passage 24, a third port 44 connected to passage 26 and a fourth port 46 connected to a vent passage 48 to atmosphere. The valve body 38 defines a central cavity 50 in which a valve member such as plug-type diaphragm 52 is received.

The outer periphery 54 of diaphragm 52 cooperates with an annular valve seat 56 to control the flow of fluid between port 40 and the fluidly communicating ports 42 and 44. A spring 58 and spring retainer 60 may be utilized to bias the outer periphery 54 into sealing contact with the valve seat 56. The central plug portion 62 cooperates with an annular valve seat 64 at port 46 to control the flow of fluid between ports 46 and the fluidly communicating ports 42 and 44. Diaphragm plug 62 is biased into sealing engagement with valve seat 64 by means of fluid pressure in conduit 20 acting on upper surface 66. The average pressure in passages 24 and 26 act upon the undersurface 68 of the diaphragm.

The operational characteristics of quick-release valve 22 are that a fluid flow (i.e. flow of higher pressurized fluid to a conduit or chamber at a lower pressurization) may be maintained from port 40 to ports 42 and 44. However, a fluid flow may not be maintained from ports 42 and 44 to port 40 as diaphragm 52 will lift to open ports 42 and 44 to the exhaust port 46. Further, the valve 22, by establishing fluid communication from port 40 to ports 42 and 44, and from the pressure of conduits 20, 24 and 26, ports 42 and 44 (conduits 24 and 26) to exhaust port 46, is effective to equalize at the pressurization of the lower pressurized of conduit 20 or average pressure of conduits 24 and 26.

It is important to note that quick-release valve 22 through which the various valves at the wheel end assemblies are vented, is located remote from the wheel end assembly and may also be located remotely from the control valve and pressure transducer to be described below.

A control valve assembly 70 is connected to a source of pressurized fluid, such as on-board compressor 72. Typically, compressor 72 will communicate with a vehicle air brake wet tank 74 which will supply the air brake system 76 with a higher priority than the CTIS control valve assembly 70. The control valve assembly is also connected to a vent passage 78 to atmosphere and to the central conduit 20.

The control valve assembly is effective to selectively vent conduit 20 to atmosphere and as a result to vent passages 24 and 26 through port 46 of Quick Release Valve 22, to pressurize conduit 20 to a relatively high pressure for inflation of the tires, to pressurize conduit 20 to a relatively low pressure to deflate the tires or to pulse conduit 20 with a high pressure to allow conduit 20 to stabilize at the average pressure in the tire chambers. Preferably, if wheel end valves similar to those disclosed in above-mentioned U.S. Pat. Nos. 4,640,331 or 4,678,017 are utilized, pressurization and venting of conduit 20 is also effective to open and close, respectively, the wheel end valves.

A pressure transducer 80 is provided for sensing the pressurization of conduit 20 and for providing an output signal indicative thereof. To obtain an accurate measurement of average tire pressure, wheel end valves 32 and 34 must be opened and conduit 20 must be sealed at control valve assembly 70 to allow the pressure in conduit 20 to attempt to stabilize at average tire pressure.

A second central conduit 82 and a pair of two-way/two-position valves 84 and 86 may be provided to allow the control valves assembly 70 and transducer 80 to be utilized to measure and control a different set of tires.

A central processing unit (CPU) 88, preferably microprocessor based, may be provided for controlling system 10. CPU 88 includes conditioning circuits 90 for receiving input signals, such as signals from pressure transducer 80, conditioning circuits 92 for issuing command output signals and logic (hardware or software) for defining logic rules by which the input signals are processed to generate command output signals.

In one embodiment, the vehicle operator is provided with a control panel 102, see FIG. 3, having five illuminatable buttons, 104, 106, 108, 110 and 112, by which a desired tire pressurization setting may be selected. Under normal conditions, the button corresponding to the current tire inflation setting will be illuminated. If a new setting is selected by depression of the appropriate button, that button will flash until the selected level of pressurization is achieved.

Upon selection of a change of pressure setting, for example from "Sand-Mud", about 20-25 psi, to "Highway", about 75 psi, the CPU will command initiation of the appropriate sequence of measurement/inflation-deflation cycles to achieve the selected pressure setting. The CPU will also determine the maximum acceptable period, either in time or in number of measurement/inflation-deflation cycles, such a change in pressure setting should require. An appropriate timer and/or counter will be initiated.

If, at the end of a maximum acceptable period, the selected level of pressurization is not achieved, a slow system response fault will be declared, the operator will be notified of the fault, and the system will be shut down.

In the CTIS of the type shown in above-mentioned U.S. Pat. No. 4,640,331, the maximum acceptable period for inflation operations is measure by number of measurement/inflation cycles (20 cycles) while the maximum acceptable period for deflation operations is measured by time (five minutes from completion of first deflation operation).

Referring to the example of a selected change from "Sand-Mud" to "Highway" inflation settings, upon selection of "Highway" the button 104 would flash and the inflation procedure would commence. If, at the maximum period (20 cycles), the inflation measured pressure was 55 psi, a slow system response fault would be declared and the CTIS shut down.

As 55 psi is between the "Highway" pressure (75 psi) and the "Cross-Country" pressure (35 psi), buttons 104 and 106 would illuminate to notify the operator that (i) a slow system response fault was sensed and the system shutdown and (ii) present inflation pressure is in the range of greater than 35 psi to less than 75 psi.

Of course, if a pressure change in the wrong direction be sensed, a different type of system fault would be indicated.

Preferably, the operator can choose to reactivate the system by depressing the button corresponding to desire pressure setting.

As may be seen by reference to FIG. 1, CTIS 10 includes an at-axle portion or portions 114 and a remote portion 116 which may be located anywhere on the vehicle, preferably at a relatively protected location. Further, the at-axle portions 114 of system 10 comprise a stationary portion 118 and rotating portions 120.

Although the preferred embodiments of the present invention have been described with a certain degree of particularity, it is understood, of course, that certain substitutions for and rearrangement of the parts may be resorted to without departing of the spirit and the scope of the present invention as hereinafter claimed.

We claim:

1. A method for controlling a CTIS including sensing and reacting to conditions indicative of system faults causing inadequate tire inflation pressurization responses to commanded changes in selected tire inflation pressurization settings, said CTIS of the type having a plurality of operator selectable tire pressurization settings which are automatically achieved and maintained by the system, said method characterized by:

sensing operator selection of a desired pressure setting to be achieved and maintained by the system;

determining the maximum acceptable period for achieving the selected pressure setting from the current pressure setting;

beginning the appropriate sequence of inflation/deflation operations to achieve the selected pressure, said appropriate inflation/deflation operations comprising repeated cycles of pressure measurement and tire inflation/deflation, said maximum period measured as a number of cycles of pressure measurement and tire inflation/deflation; and if the maximum acceptable period expires prior to achieving the selected pressure setting, discontinuing pressure measurement and adjustment operations, declaring a system fault and notifying the operator of said fault.

2. A method for controlling a CTIS including sensing and reacting to conditions indicative of system faults causing inadaquate tire inflation pressurization responses to commanded changes in selected tire inflation pressurization settings, said CTIS of the type having a plurality of operator selectable tire pressurization settings which are automatically achieved and maintained by the system, said method characterized by:

sensing operator selection of a desired pressure setting to be achieved and maintained by the system;

determining the maximum acceptable period for achieving the selected pressure setting from the current pressure setting;

beginning the appropriate sequence of inflation/deflation operations to achieve the selected pressure, said appropriate inflation/deflation operations comprising repeated cycles of pressure measurement and then tire inflation/deflation, for deflation operations, said maximum period measured as an elapsed time and for inflation operations, said maximum period measured as completion of a predetermined number of said cycles.

if the maximum acceptable period expires prior to achieving the selected pressure setting discontinuing pressure measurement and adjustment operations, declaring a system fault and notifying the operation of said fault.

3. The method of claim 1 or 2 wherein said CTIS includes separate indicia means for each selectable pressurization setting, each of said indicia means having a first and a second visual condition, said first condition for visually indicating the achievement or selection of the pressure setting corresponding thereto, said method further characterized by said notifying the operator of said fault comprising causing the indicia means of the both the next higher and next lower selectable pressure setting from the sensed pressure at expiration of said period to assume the first conditions thereof.

4. The method of claim 3 wherein said indicia means are selectively illuminated and unilluminated members, said first and second conditions comprising, respectively, the illuminated and unilluminated conditions, respectively, thereof.

5. The method of claim 4 wherein said notification comprises illumination of a said indicia means corresponding to the next higher and next lower pressure settings.

6. The method of claim 1 or 2 wherein said CTIS may be reset to attempt to achieve and maintain a selectable pressure setting by reselecting a selectable pressure setting after notification.

7. A control system for controlling a CTIS including sensing and reacting to conditions indicative of system faults causing sluggish system responses to commanded changes in selected tire inflation pressurization settings, said CTIS of the type having a plurality of operator selectable tire pressurization settings which are automatically achieved and maintained by the system, said system characterized by:
means for sensing operator selection of a desired pressure setting to be achieved and maintained by the system;
means for determining the maximum acceptable period for achieving the selected pressure setting from the current pressure setting;
control means for beginning the appropriate sequence of inflation/deflation operations to achieve the selected pressure wherein said appropriate inflation/deflation operations comprise repeated cycles of pressure measurement and tire inflation/deflation and said maximum period measured as a number of cycles of pressure measurement and tire inflation/deflation, and if the maximum acceptable period expires prior to achieving the selected pressure setting, discontinuing pressure measurement and adjustment operations and declaring a system fault and notifying the operator of said fault.

8. A control system for controlling a CTIS including sensing and reacting to conditions indicative of system faults causing sluggish system responses to commanded changes in selected tire inflation pressurization settings, said CTIS of the type having a plurality of operation selectable tire pressurization settings which are automatically achieved and maintained by system, said system characterized by:
means for sensing operator selection of a desired pressure setting to be achieved and maintained by the system;
means for determining the maximum acceptable period for achieving the selected pressure setting from the current pressure setting;
control means for beginning the appropriate sequence of inflation/deflation operations to achieve the selected pressure wherein said appropriate inflation/deflation operations comprise repeated cycles of pressure measurement and then tire inflation/deflation, for deflation operations, said maximum period measured as an elapsed time and for inflation operations, said maximum period measured as completion of a predetermined number of said cycles and in the maximum acceptable period expires prior to achieving the selected pressure setting, discontinuing pressure measurement and adjustment operations and declaring a system fault and notifying the operator of said fault.

9. The system of claim 7 or 8 wherein said CTIS includes separate indicia means for each selectable pressurization setting, each of said indicia means having a first and a second visual condition, said first condition for visually indicating the achievement or selection of the pressure setting corresponding thereto, said method further characterized by said notifying the operator of said fault comprising causing the indicia means of the both the next higher and next lower selectable pressure setting from the sensed pressure at expiration of said period to assume the first conditions thereof.

10. The system of claim 9 wherein said indicia means are selectively illuminated and unilluminated members, said first and second conditions comprising, respectively, the illuminated and unilluminated conditions, respectively, thereof.

11. The system of claim 10 wherein said notification comprises illumination of said indicia means corresponding to the next higher and next lower pressure settings.

12. The system of claim 7 or 8 wherein said CTIS may be reset to attempt to achieve and maintain a selectable pressure setting by reselecting a selectable pressure setting after notification.

* * * * *